(12) United States Patent
Walter et al.

(10) Patent No.: US 10,618,224 B2
(45) Date of Patent: Apr. 14, 2020

(54) METHOD FOR WELDING TWO POLYAMIDE PLASTICS

(71) Applicant: Henkel AG & Co. KGaA, Duesseldorf (DE)

(72) Inventors: Pablo Walter, Munich (DE); Norman Friedrich, Munich (DE); Lina Gonzalez, Munich (DE); Hendrik Luetzen, Munich (DE); Thomas Haertig, Munich (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/934,283

(22) Filed: Mar. 23, 2018

(65) Prior Publication Data

US 2018/0207882 A1  Jul. 26, 2018

Related U.S. Application Data

(63) Continuation of application No. PCT/EP2016/074658, filed on Oct. 14, 2016.

(30) Foreign Application Priority Data

Oct. 16, 2015 (EP) .................................... 15190200

(51) Int. Cl.
| | | |
|---|---|---|
| B32B 27/34 | (2006.01) | |
| B29C 65/40 | (2006.01) | |
| B29C 65/54 | (2006.01) | |
| B29C 65/00 | (2006.01) | |
| C09J 5/02 | (2006.01) | |
| B29C 65/02 | (2006.01) | |
| C08F 22/06 | (2006.01) | |
| C08F 222/08 | (2006.01) | |
| C08L 25/08 | (2006.01) | |
| C08L 35/00 | (2006.01) | |
| B29C 65/06 | (2006.01) | |
| B29C 65/08 | (2006.01) | |
| B29C 65/14 | (2006.01) | |
| B29C 65/50 | (2006.01) | |
| B29C 65/18 | (2006.01) | |
| B29C 65/16 | (2006.01) | |
| B29C 65/20 | (2006.01) | |
| B29C 65/38 | (2006.01) | |
| B29C 65/04 | (2006.01) | |
| B29C 65/10 | (2006.01) | |
| B29C 65/72 | (2006.01) | |
| C08L 77/02 | (2006.01) | |

(52) U.S. Cl.
CPC ............ *B29C 65/405* (2013.01); *B29C 65/02* (2013.01); *B29C 66/02* (2013.01); *B29C 66/026* (2013.01); *B29C 66/71* (2013.01); *B29C 66/712* (2013.01); *C08F 22/06* (2013.01); *C08F 222/08* (2013.01); *C08L 25/08* (2013.01); *C08L 35/00* (2013.01); *C09J 5/02* (2013.01); *B29C 65/04* (2013.01); *B29C 65/06* (2013.01); *B29C 65/0618* (2013.01); *B29C 65/0627* (2013.01); *B29C 65/0636* (2013.01); *B29C 65/0672* (2013.01); *B29C 65/08* (2013.01); *B29C 65/10* (2013.01); *B29C 65/1412* (2013.01); *B29C 65/1425* (2013.01); *B29C 65/16* (2013.01); *B29C 65/1635* (2013.01); *B29C 65/1658* (2013.01); *B29C 65/1661* (2013.01); *B29C 65/1667* (2013.01); *B29C 65/1696* (2013.01); *B29C 65/18* (2013.01); *B29C 65/20* (2013.01); *B29C 65/38* (2013.01); *B29C 65/5057* (2013.01); *B29C 65/72* (2013.01); *B29C 66/731* (2013.01); *B29C 66/73921* (2013.01); *C08F 2500/01* (2013.01); *C08L 77/02* (2013.01); *C09J 2425/003* (2013.01); *C09J 2477/006* (2013.01); *C09J 2477/008* (2013.01)

(58) Field of Classification Search
CPC ...................................................... B32B 27/34
USPC ...................................................... 428/474.4
See application file for complete search history.

(56) References Cited

U.S. PATENT DOCUMENTS

2005/0004312 A1* 1/2005 Crevecoeur .......... C08G 81/028
                                                              525/206

FOREIGN PATENT DOCUMENTS

| EP | 1 757 431 | | 2/2007 | |
|---|---|---|---|---|
| EP | 2669076 A1 | * | 12/2013 | ............ B29C 70/68 |
| JP | 2011240496 A | | 12/2011 | |
| WO | 02/070605 | | 9/2002 | |
| WO | 02/090425 | | 11/2002 | |

OTHER PUBLICATIONS

International Search Report issued in connection with International Patent Application No. PCT/EP2016/074658 dated Dec. 6, 2016.
Dong Hengqian, "Progress in the World Chemistry Industry," Chemical Industry Press, Jul. 1986.
"Plastic Alloy," Japanese Polymer Society, China Light Industry Press, Sep. 1992.

* cited by examiner

*Primary Examiner* — Michael J Feely
(74) *Attorney, Agent, or Firm* — James E. Piotrowski

(57) ABSTRACT

The present invention relates to a method for welding two polyamide plastics using a primer, the primer containing at least one polymer synthesized from at least one maleic anhydride or maleic anhydride derivative. The invention also relates to correspondingly welded products.

16 Claims, No Drawings

METHOD FOR WELDING TWO POLYAMIDE PLASTICS

The present invention relates to a method for welding two polyamide plastics using a primer, the primer containing at least one polymer synthesized from at least one maleic anhydride or maleic anhydride derivative. The present invention also relates to correspondingly welded products.

Various methods are known from the prior art for interconnecting two or more substrates that consist of plastics materials, such as polyethylene (PE), polyacrylates or polyamide (PA). In this case, there are both mechanical connection options, such as locking or screwing, or adhesive bonding methods. Alternatively, plastics materials can also be welded together. Welding is a joining method for non-detachably, integrally, physically interconnecting plastics materials that are generally of the same type, such as PE and PE, or two identical PAs. In this case, identical PAs are understood to be two polyamides that do not differ either in terms of their repeat unit or in terms of the type of filler. Thermoplastics of the same type are polymers that do not differ substantially in terms of their molecular structure, their melting point, their melting viscosity and their coefficient of thermal expansion, and can in principle be mixed with one another to an extent. Plastics materials of the same type are usually plastics materials having an identical polymer base and/or are identical plastics materials.

A wide range of methods are known for welding together two or more plastics materials of the same type. In this case, a wide range of welding methods can be used, such as infrared welding, infrared/friction welding, ultrasonic welding or hot plate welding. These methods for welding plastics materials of the same type are based on the relevant plastics materials being melted in the region of the welding zone and the materials being interconnected in said zone in an integrally bonded and frictional manner.

These welding methods work well provided that plastics materials of the same type or identical plastics materials are to be interconnected. However, as soon as two plastics materials that are not of the same type and/or that are mutually incompatible are to be welded together, it is not possible to produce a lasting connection between the two substrates that has a sufficiently high mechanical strength. In the event of an attempt being made to directly weld two different polyamide plastics using a welding method known from the prior art, usually very low and inadequate strengths are obtained.

Up to now, it has been possible to interconnect corresponding different polyamide plastics only by means of a mechanical connection or an adhesive bonding method in order to achieve high strengths. The disadvantage of a mechanical connection is the complicated attachment, the punctual material stress, and the need to use an additional mechanical connection means. Furthermore, integrally bonded connections can rarely be achieved in the case of a mechanical connection. The disadvantage of an adhesive bonding method, however, is that the final strength of the connection is achieved only after a long period of time which may be of up to several weeks. Furthermore, adhesively bonding low-energy surfaces usually requires laborious pretreatment of the join partners. In addition, an adhesive connection is often not indefinitely stable on account of outside weather conditions. Moreover, providing a clean adhesive connection is often complicated and time-consuming. Connection by means of a welding method is thus the cleanest, quickest and simplest solution for plastics materials.

The object of the present invention is therefore that of providing a simple method for welding two polyamide plastics, it being intended to achieve mechanical strengths that are as high as possible. In this case, the connection between said different polyamide plastics by means of the weld seam is intended to be as stable as possible and long-lasting.

It has surprisingly been found that this object is achieved by a method for welding two polyamide plastics using a primer, the primer containing at least one polymer synthesized from at least one maleic anhydride or maleic anhydride derivative.

Using a primer containing at least one corresponding polymer has made it possible to achieve particularly stable and non-aging connections between the plastics materials when welding two polyamide plastics.

The join partners to be welded using a primer according to the invention are two polyamide plastics. The two preferably different polyamide plastics are in particular thermoplastic polyamides. The amide-based thermoplastic polymers included, for example, polyamide 6, a homopolymer of epsilon-caprolactam (polycaprolactam); polyamide 11, a polycondensate of 11-Aminoundecanoic acid poly(11-aminoundecanamide); polyamide 12, a homopolymer of omega-lauryl lactam (polylauryl lactam); polyamide 6.6, a homopolycondensation of hexamethylenediamine and adipic acid (polyhexamethylene adipamide); polyamide 6.10, a homopolycondensation of hexamethylenediamine and sebacic acid (poly(hexamethylene sebacamide)); polyamide 6.12, a homopolycondensation of hexamethylenediamine and dodecanedioic acid (polyhexamethylene dodecanamide), or polyamide 6-3-T, a homopolycondensation of trimethyihexamethylenediamine and terephthalic acid (polytrimethylhexamethylenediamine), poly(p-phenylene terephthalamide) or poly(m-phenylene terephthalamide) of phenylenediamine and terephthalic acid, polyphthalamides (PPA) of different diamines and terephthalic acid, and mixtures thereof.

Optically transparent polyamides include monocrystalline polyamides containing linear aliphatic dicarboxylic acids and cyclo-aliphatic diamines, amorphous polyamides containing linear aliphatic dicarboxylic acids and cyclo-aliphatic diamines and optionally lactams or amino acids, amorphous polyamides containing terephthalic acid and cyclo-aliphatic or branched aliphatic diamines and optionally lactams or amino acids, or amorphous polyamides containing isophthalic acid and cyclo-aliphatic or linear or branched aliphatic diamines and optionally lactams or amino acids. Suitable optically transparent polyamides are, for example, amides of dodecanedioic acid and a mixture of isomers of 4,4'-diaminodicyclohexylmethane, of terephthalic acid and the mixture of isomers of 2,2,4- and 2,4,4-trimethyihexamethylenediamine, of dodecanedioic acid and the mixture of isomers of 3,3'-dimethyl-4,4'-diaminocyclohexylmethane, of lauryl lactam, isophthalic acid and the mixture of isomers of 3,3'-dimethyl-4,4'-diaminocyclohexylmethane or of tetradecanedioic acid and the mixture of isomers of 3,3'-dimethyl-4,4'-diaminocyclohexylmethane or of epsilon-caprolactam or omega-lauryl lactam.

Preferred polyamides are selected from the group consisting of polyamide 6, polyamide 6.6, polyamide 6.10, polyamide 6.12, polyamide 10.10, polyamide 11, polyamide 12, polyamide 10.12, polyphthalamides, optically transparent polyamides or mixtures based on said polyamides. Particularly preferred polyamides are selected from polyamide 6, polyamide 6.6, polyamide 12, polyphthalamides, optically transparent polyamides and the mixtures thereof.

Each polyamide plastics can also contain further components, e.g. fillers such as glass fibers, pigments, mineral particles, dyes, rheology auxiliary agents, release aids or stabilizers. Each polyamide plastics to be joined preferably consists to more than 40 wt. %, in particular more than 60 wt. %, preferably more than 70 wt. %, preferably more than 90 wt. % of the mentioned polymer, based in each case on the total polyamide plastics (including fillers). Each polyamide plastics to be joined preferably consists to more than 90 wt. %, in particular more than 95 wt. %, preferably more than 98 wt. % of the mentioned polyamides, based in each case on the total polymer content of the polyamide plastics (total polyamide plastics without fillers). Each polyamide plastics preferably has a content of the mentioned polyamides of 50-90 wt. %, in particular 60-80 wt. %, based in each case on the total polyamide plastics (including fillers).

Two identical PAs are understood to be two polyamides that do not differ either in terms of their repeat unit or in terms of the type of filler. The two polyamide plastics to be joined preferably differ in terms of the type and/or sequence of the repeat unit of the polyamide polymer or in the structure of the polyamide polymer on which the polyamide plastics are based. In particular the average number of carbon atoms per structural unit of the polyamide polymers of the polyamide plastics differ by more than 1, in particular more than 2, preferably more than 6 carbon atoms. For example, polyamide 6 and polyamide 6.6 each have 6 carbon atoms per structural unit, while polyamide 6.12 comprises nine carbon atoms per structural unit. The first join partner is preferably selected from the polyamide plastics from the group consisting of polyamide 6, polyamide 6.6, polyamide 6.10, polyamide 6.12, and the second join partner is preferably selected from the polyamide plastics from the group consisting of polyamide 10.10, polyamide 11, polyamide 12. Polyamide 6 (polycaprolactam) is preferably welded to polyamide 12 (polylauryl lactam). Furthermore, the plastics materials to be joined can differ in terms of the fillers thereof and consequently in terms of the plastics content thereof, for example a polyamide having varying amounts of glass fiber filling and a mineral-filled polyamide. The two polyamide plastics to be joined can thus differ in terms of the structure of the polyamide polymer and/or in terms of the fillers thereof and/or in terms of the plastics content, in particular in terms of the structure of the polyamide polymers.

A further essential part of the invention is the use of at least one primer, preferably precisely one primer. The primer contains at least one polymer which contains at least one maleic anhydride or maleic anhydride derivative as a monomer incorporated by polymerization.

The primer is a welding auxiliary agent that is preferably applied, as a pretreatment layer, to at least one of the substrate surfaces to be welded, in the region of the joining zone. The primer is not to be understood as an adhesive, cleaning agent or similar, but instead the primer is an auxiliary agent for welding, as a result of which the join partners are made mutually compatible in the joining zone (or welding zone), and thus an integrally bonded and frictional connection is achieved in the joining zone, upon joining, between the substrates to be welded.

Tests have shown that using a corresponding primer that contains a polymer according to the invention makes it possible for the two different polyamide plastics to be made compatible in the join seam upon welding, and for a stable and lasting connection to thus be achieved. Without using a corresponding primer, only very low strengths of the welded connection could be achieved. Preferably, the joined substrates have a tensile strength of more than 5 MPa, in particular more than 7 MPa, preferably more than 10 MPa. The tensile strength is determined at a traction speed of 5 mm/s and in accordance with the test execution described in the tests.

The at least one first polymer in the primer is preferably synthesized at least from the monomer maleic anhydride or maleic anhydride derivative. In this case, the polymer contains the maleic anhydride group in the form in which it is incorporated by polymerization. An example of a maleic anhydride derivative is 1,2,3,6-Tetrahydrophthalic anhydride, which comprises the relevant 5-member anhydride group. The first polymer is preferably a copolymer, preferably containing at least one styrene or styrene derivative and at least one maleic anhydride or maleic anhydride derivative. In addition to the maleic anhydride or maleic anhydride derivative, the polymer can also contain further monomers incorporated by polymerization. The copolymer preferably contains monomers selected from the group of acrylates and methacrylates (together (meth)acrylates), in particular (meth)acrylates comprising an alkyl functional group having from 1 to 12 carbon atoms, preferably 1 to 4 carbon atoms, preferably methyl(meth)acrylate. Furthermore, functional monomers having functionalities such as epoxide or isocyanate groups, carboxyl or amine groups, but also alkoxysilane groups can also be used.

In a particular embodiment, the copolymer consists of styrene and maleic anhydride incorporated by polymerization. In another particular embodiment, the copolymer consists of styrene, maleic anhydride and methyl methacrylate incorporated by polymerization. The monomers can be used in different molar ratios in these variants.

In a preferred embodiment of the copolymer according to the invention, the molar ratio of styrene to maleic anhydride is from 1:0.01 to 1:2, preferably 1:0.05 to 1:1, particularly preferably 1:0.1 to 1:0.3. In a further preferred embodiment of the copolymer according to the invention comprising acrylate and/or methacrylates incorporated by polymerization, in particular methyl acrylate and/or methyl methacrylate, the molar ratio of styrene to (meth)acrylate to maleic anhydride is from 1:5:2 to 1:0.2:0.01, in particular 1:2:1 to 1:0.5:0.05, preferably 1:1.5:0.5 to 1:0.8:0.1, particularly preferably 1:1:0.2.

The copolymers can be synthesized from the monomers in a known manner. In addition, the copolymers can be grafted in a polymer-like reaction. Particularly preferred reactants for grafting are alcohols, thiols, amines, isocyanates, anhydrides, carboxylic acids, in particular alcohols, preferably alcohols having from 1 to 6 carbon atoms, such as methanol and isobutanol. For the purpose of grafting, the maleic anhydride monomers or maleic anhydride units in the polymer react with the reagent, in particular are esterified by alcohols. The maleic anhydride groups preferably react or esterify only partially, in particular less than 70% of the maleic anhydride groups. Preferably, 5 to 70% of the maleic anhydride groups are esterified, in particular with methanol and/or isobutanol. It may also be preferable for the maleic anhydride groups not to be reacted and to continue to be present as anhydride groups. In the preferred embodiment, the maleic anhydride groups can also be present hydrolyzed in part. Complete reaction of the maleic anhydride groups can lead to a reduction in the strength of the resulting welded connection.

Polymers or copolymers that have a maleic anhydride content of more than or equal to 0.1 wt. %, in particular more than or equal to 0.5 wt. %, preferably more than or equal to 4 wt. %, particularly preferably more than or equal to 8 wt.

%, based on the polymer, are particularly advantageous. The polymers advantageously have a maleic anhydride content of 0.1-50 wt. %, in particular 0.5-40 wt. %, preferably 4-30 wt. %, particularly preferably 8-26 wt. %, based on the polymer. Polymers having a corresponding maleic anhydride content exhibit particularly good strengths of the welded connection.

Furthermore, polymers are preferred that have a glass transition temperature Tg (determined by means of DSC at a heating rate of 10 K/min in nitrogen, in particular following DIN EN ISO 11357-1:2010-3 and DIN EN ISO 11357-2:2014-07) of more than 30° C., in particular more than 80° C., particularly preferably more than 100° C. Polymers having a corresponding glass transition temperature in particular improve the mechanical properties of the welded connection.

The polymers or copolymers advantageously have a weight-average molecular weight Mw of more than or equal to 5000 g/mol, in particular more than or equal to 50000 g/mol, preferably more than or equal to 100000 g/mol, particularly preferably more than or equal to 175000 g/mol. The polymers or copolymers preferably have a weight-average molecular weight Mw in the range of from 5000-2000000 g/mol, in particular from 50000-1000000 g/mol, preferably from 100000-500000 g/mol. Polymers or copolymers having a corresponding weight-average molecular weight have a positive effect on the brittleness and strength of the obtained connection. The weight-average molecular weight can be determined by GPC against a polystyrene standard.

In addition to the first polymer according to the invention, the primer can preferably contain at least one further polymer. The at least one further polymer or copolymer is preferably compatible with at least one of the two plastics materials to be welded and with the primer polymer. The primer particularly preferably contains at least one polyamide polymer, preferably one of the polyamide polymers specified above. Using an additional polymer in the primer as well as the copolymer according to the invention has led to a further improvement in the strength.

The polymer used as the compatible further polymer is preferably one having a weighted quadratic distance of the Hansen parameter $(R_a)^2$, in particular from the two plastics materials to be joined and in particular also from the first polymer according to the invention mentioned above, of less than 22 MPa, in particular of less than 17 MPa, preferably of less than 15 MPa, particularly preferably of less than 12 MPa.

The weighted quadratic distance of the Hansen parameter $(R_a)^2$ is determined according to the following formula:

$$(R_a)^2 = 4(\Delta\delta_D)^2 + (\Delta\delta_P)^2 + (\Delta\delta_H)^2$$

In this formula, $\delta_D$ is the Hansen parameter for the dispersion forces, $\delta_P$ is the Hansen parameter for the polarity, and $\delta_H$ is the Hansen parameter for the hydrogen bridge bonds. $\Delta\delta_D$, $\Delta\delta_P$ and $\Delta\delta_H$ in each case denote the differences of these Hansen parameters for the plastics materials or polymers to be compared, e.g., $\Delta\delta_D = (\delta_{D1} - \delta_{D2})$ of polymers 1 and 2. The values of the individual Hansen parameters $\delta_D$, $\delta_P$ and $\delta_H$ for the relevant plastics materials or polymers are determined according to the book "Hansen Solubility Parameters: A User's Handbook" by Charles M. Hansen (second edition; Taylor & Francis Group; 2007; ISBN-10 0-8493-7248-8). A number of values for individual polymers can already be found in this source. According to the method described in this book, the Hansen parameters can preferably be obtained from the accompanying database using the program HSPIP (4th edition 4.1.07), or, if this is not available, can be determined using the incorporated "DIY" functionality of the program, preferably using the accompanying neural network, as described in the "help" section. The HSPIP program is available from the company Steven Abbott TCNF Ltd.

The content of the further polymer, in particular the polyamide polymer, on the primer is preferably 0-40 wt. %, in particular 5-30 wt. %, particularly preferably 10-20 wt. %, based in each case on the total weight of the primer. The content of the further polymer, in particular a polyamide polymer, on the polymer content of the primer is preferably 5-70 wt. %, in particular 20-60 wt. %, particularly preferably 30-50 wt. %, based in each case on the total polymer content of the primer (primer without solvents and without fillers).

In addition to the first polymer and the further polymer, the primer can also contain a solvent, in particular an organic solvent. The primer preferably has a solvent content of 10-90 wt. %, in particular 50-85 wt. %, particularly preferably 60-80 wt. %, based in each case on the total weight of the primer.

All conventional solvents, such as water, alcohols, ketones such as methyl isobutyl ketone (MIBK) or cyclohexanone (CH), ethers such as diethyl ether or tetrahydrofuran (THF), esters such as ethyl acetate, or carbonates such as dimethyl or dipropyl carbonate or mixtures thereof are suitable solvents.

In a preferred embodiment, the primer contains organic solvents. Solvents having a vapor pressure at 20° C. of from 1 to 600 hPa, in particular 2 to 200 hPa, particularly preferably 5 to 20 hPa are particularly preferred. In this case, solvents having a corresponding vapor pressure have been found to be particularly advantageous for minimizing or preventing bubble formation in the primer layer upon evaporation. Particularly preferably the primer contains a solvent selected from tetrahydrofuran (THF), methyl isobutyl ketone (MIBK), cyclohexanone (CH) and mixtures thereof, particularly preferably the primer contains THF, cyclohexanone or a mixture of MIBK and CH, most particularly preferably the primer contains cyclohexanone. If a mixture of methyl isobutyl ketone and cyclohexanone is used as the solvent, said mixture preferably contains 10-50 wt. %, in particular 20-35 wt. % cyclohexanone, based in each case on the total solvent mixture.

If organic solvents are used, the total polymer content of the primer is preferably 10-90 wt. %, in particular 15-50 wt. %, particularly preferably 20-40 wt. %, based in each case on the total weight of the primer. The total polymer content corresponds to the content of all the polymers used in the primer, in particular the polymers according to the invention and the further polymers described above.

In another preferred embodiment the primer is present in the form of an aqueous dispersion or emulsion. In this case, the polymer according to the invention and, if present, the further polymers, are emulsified or dispersed in water. In this case, the total polymer content of the primer is preferably 5-90 wt. %, in particular 20-70 wt. %, particularly preferably 30-55 wt. %, based in each case on the total weight of the primer. For the aqueous dispersion/emulsion, it is advantageous for the polymer component to consist substantially of only the polymer according to the invention and the optionally present further polymer mentioned above, in particular only the polymer according to the invention. The term "substantially of" is understood, according to the invention, to mean that the polymer component consists of more than 95 wt. %, preferably more than 97 wt. %, most particularly preferably more than 99 wt. % of the polymer according to the invention and the optionally present further polymer mentioned above, in particular consists only of the polymer according to the invention.

In addition to the polymer according to the invention, the further polymers mentioned above, and a solvent, the primer may contain further components such as fillers, (fluorescent) dyes and pigments, defoaming agents, wetting agents, stabilizers or plasticizers. However, apart from dye and pigments, the primer is preferably substantially free of further components, in particular substantially free of any other components. The term "substantially free of" is understood, according to the invention, to mean that the primer contains less than 5 wt. %, preferably less than 1 wt. %, most particularly preferably less than 0.1 wt. % of the relevant substances, in particular does not contain the relevant substances.

In the method according to the invention for welding two polyamide plastics, a primer is used, the primer containing at least one polymer synthesized from at least one maleic anhydride or maleic anhydride derivative.

In this method, the primer is used as an auxiliary agent for welding the two different polyamide plastics, by fusion in each case. The primers used containing a polymer according to the invention make it possible to produce compatibility between the two join partners, as a result of which a stable and lasting integrally bonded connection between the two plastics materials can be produced.

The primer can be applied to the surface of one or both join partners using a wide range of methods. Thus, for example, said primer can be applied using a metering device, using a needle and metering robot, by means of injection molding, by means of extrusion, by means of film coating, by means of application as a hot melt, by means of spraying, by means of spreading, or by means of dipping. In this case, the primer can be applied either to just one surface or to both surfaces of the substrates to be welded. The primer is preferably applied to just one surface. In the case of welding using a film, the film can be laid between the substrates.

In the case of the primer containing a solvent, after being applied to one or both surfaces, the primer is preferably dried until the solvent has evaporated to such an extent that a non-sticky, dimensionally stable primer layer is achieved. After being applied, the primer is preferably dried for at least one hour, preferably for at least 12 hours. In particular, the primer is weldable after just a few seconds and for a period of up to several weeks.

The application to one or both surfaces of the substrates to be welded is preferably carried out such that the primer has a layer thickness of from 1 μm to 5000 μm, in particular 10-3000 μm, preferably 50-1000 μm, particularly preferably 100-500 μm. If a solvent was contained in the primer, the layer thickness refers to the primer that has been dried of the solvent.

After the primer has been applied to one or both surfaces of the substrates to be welded, and optionally after the primer has dried, the substrates to be welded can be interconnected using a conventional welding method. Welding of plastics materials is usually carried out by means of local plasticization of the join partners in the joining plane, and joining under pressure. The process parameters should be selected such that pronounced squeezed flowing of the melt results in optimum connection of the join partners in the joining plane. Heating can be carried out by means of convection, contact heating, radiation or friction. The different energy input for plasticization can occur in a range of ways and has resulted in different processes for welding plastics materials.

Suitable welding methods are, for example:
Hot gas welding [HG]
Convective heating using a hot gas stream, in general air, two-stage process
Hot plate welding [HP]
Contact heating, two-stage process
Ultrasonic welding [US]
Heating by means of friction, a transverse wave in the ultrasound range leads to heating in the boundary layer, single-stage process
High frequency welding [HF]
Heating by internal friction, polar molecules align according to a high-frequency magnetic field, single-stage, only used for polar plastics materials and films
Friction welding [FRW]: Linear; Orbital; Spin; Angle
Heating by means of friction, single-stage process
Laser welding [LW]: contour, simultaneous, quasi-simultaneous, mask
Heating by means of radiation, coherent radiation, laser transmission welding, generally single-stage (two-stage is possible)
Infrared welding [IR]
Heating by means of radiation, incoherent radiation, two-stage The welding methods set out above can optionally also be combined such as, for example, infrared welding and friction welding. The polyamide plastics is particularly preferably welded using a welding method selected from hot plate welding, thermal contact or thermal pulse welding, warm gas or hot gas welding, friction welding, microwave or induction welding, laser butt or laser irradiation welding, infrared welding, ultrasonic welding and combinations thereof, in particular selected from hot plate welding, friction welding, infrared welding, ultrasonic welding and combinations thereof, preferably selected from infrared welding, ultrasonic welding and combinations thereof.

A method for integrally joining the two plastics materials using the primer that contains the following steps is particularly preferred:
providing the first plastics material comprising a first joining zone,
providing the second plastics material comprising a second joining zone,
preheating the first joining zone,
applying the primer to the preheated first joining zone, in particular in the case of solvent-free primers,
bringing the first joining zone provided with the primer into contact with the second joining zone,
integrally connecting the first joining zone to the second joining zone, in particular by using conventional plastics materials welding methods such as infrared welding, hot plate welding, hot gas welding, friction welding, ultrasonic welding.

In general, DIN 1910-3:1977-09 can be applied for welding plastics materials. Therefore, integral joining of thermoplastic plastics materials using heat and/or pressure can be understood in this context. The heating can be carried out for example on the basis of contact heating (welding using solid bodies), convection heating (welding using hot gas), radiation heating (welding using a beam), and heating by means of friction (welding by means of movement), as well as welding by means of electrical power.

In an advantageous development, a primer is used that is selected and matched to the method such that application thereof to a heated and/or hot joining zone at a temperature that is lower than the decomposition temperature of the polymers in the primer does not have any influence on the internal chemical cross-linking of the primer.

It is advantageous to preheat the first joining zone of the first plastics material. Auxiliary agents and techniques that are known to a person skilled in the art and are suitable for the purpose can be used for preheating. In particular, using hot gas or plasma is suitable for preheating. Preheating by means of radiation, in particular infrared radiation or laser radiation, is also conceivable. A heating element or a heated tool can also be used for preheating the first joining zone. Finally, preheating in an oven or in a heated room is also conceivable. Preheating the entire plastics material and thus also said joining zone is conceivable. Alternatively, or in addition, however, it is also possible to preheat merely the joining zone itself.

In an advantageous development, the spacing of the heating device from the plastics material, in particular from the first joining zone to be preheated, in particular the spacing of the heat-emitting region of the heating device or the heat-emitting region of the heating device or the effective surface to be preheated of the heating device or the region of the heating device opposite the first joining zone is in a range of from 0.5 mm to 100 mm, preferably in a range of from 1 mm to 60 mm during preheating. It is also conceivable, alternatively, for heating to be carried out by and/or while making contact between in particular the first joining zone and the heating element of the heating device.

Selecting the plastics material for the first join partner and adjusting the method parameters to the first plastics material such that the first joining zone melts when preheated and that a melt layer is produced in the first joining zone upon preheating is a further advantage. In a particularly preferred embodiment, the thickness of the melt layer is preferably in the range of from 0.05 mm to 6 mm, particularly preferably in the range of from 0.1 mm to 5 mm. A melt layer of this kind can result in better adhesion and/or diffusion and/or interaction of the molecules and, in conjunction with a specific flow, to an improved connection layer. If the boundary layer of the first plastics material is in the molten state interactions as far as chemical bonding with the primer may occur. The melt layer can in particular be dependent on the component geometry and the relevant component design. Preferably, the method parameters are adjusted and/or selected such that no deformation of the components results. Temperature differences between the joining zone and the primer to be applied are preferably equalized using suitable means and/or method steps. In this case, it is conceivable in particular to preheat the primer in order to reduce the temperature difference between the preferably thermoplastic primer and the first joining zone. This can for example counteract the rapid cooling of the first joining zone between the process steps.

Optionally, the first joining zone is pretreated, preferably before the step of preheating the first joining zone. Alternatively, or in addition, the second joining zone can also be pretreated. For example, cleaning using a solvent or a for example alkaline plastics cleaner is conceivable as a possible pretreatment. Mechanical pretreatment may also be used, in particular by means of scraping, polishing, brushing or radiation. Conceivable chemical pretreatments are in particular acid cleaning or using reactive gases. Moreover, the use of a thermal, chemical and/or physical pretreatment may prove expedient, in particular by means of gas flames or plasma arcs. Alternatively, or in addition, electrical pretreatment by means of corona discharge can, during which the first joining zone and/or the second joining zone is subjected to electrical corona discharge in order that polar molecules result at the corresponding surface. A further option is plasma treatment, preferably using a plasma nozzle, for pretreating the joining zone, in particular in order to activate and/or clean the corresponding surface. Nonetheless, coating by means of plasma may also prove expedient. A further option is flaming the joining zone in order to increase the surface tension in suitable plastics materials. A further type of pretreatment is radiation using UV rays, electron beams, radioactive rays or by means of a laser. Finally, pretreatment may also be carried out in the form of a coating, in particular by painting or using an adhesion promoter. It is also conceivable to pretreat the first plastics material or the joining zones of the first plastics material a longer time before preheating. It is thus conceivable, for example, to already carry out the pretreatment during the process of manufacturing the first plastics material, in order to be able to further process the pretreated plastics material in the method according to the invention.

It is conceivable for the primer to be applied in various ways. For example, and in particular in the industrial field, application using an automated application aid, in particular by means of a metering robot, is conceivable. In this case, said robot can be equipped with a needle and/or a height sensor in order to be able to carry out complex metering processes. The primer may also be applied by means of injection molding, in that the primer is plasticized in an injection molding machine and injected under pressure into the mold containing the first plastics material comprising the first joining zone. A film application is alternatively conceivable, a film first being prepared from the primer in a first by means of film blowing or flat film extrusion. Subsequently, the film can be cut into any desired shape, for example by means of a cutting or stamping method, and, following the mentioned preheating, can be applied, in a further step, to the first joining zone. In this case, it has been found to be expedient to use films/plates having a thickness in the range of 1 μm-5000 μm. Further conceivable application possibilities are extrusion welding, during which the primer is present in the form of a welding wire or melted in an extruder and can be applied, in molten form, to the first joining zone. It is also possible for the primer to be provided in the form of a welding wire in order to make application by means of hot air welding possible. A further option is to apply the primer by means of a spraying method. Pretreatment and/or preheating and/or locally varied temperature control of the injection molding tool is also possible in the case of application during injection molding. Of course, other types of application that are known to a person skilled in the art and are suitable for the specific use are also conceivable.

Further heating or heating the first joining zone while the primer is being applied, in particular in order to prevent the temperature of the first joining zone from dropping between preheating and application of the primer is a further advantage. This can be carried out by means of the preheating method step described above which, for the sake of simplicity, can be continued during the application. Alternatively, or in addition, additional heating, in particular by means of a further method step, is possible. It may thus prove to be expedient, for example, to simultaneously heat the first joining zone, for example by means of simultaneously exposing the first joining zone to radiation, forced convection, contact heating during primer application, in order to prevent the temperature of the first joining zone from dropping following the preheating.

In an advantageous development, the primer is applied such that a connection layer having a thickness in the range of from 1 μm to 5 mm, preferably in the range of from 10 μm to 3 mm, is arranged on the first joining zone. In this case, the thickness of the connection layer is to be understood as the material thickness of the connection layer on the first joining zone.

A further advantage is applying the primer to the first joining zone by means of a metering device while the first joining zone and the metering device are moved relative to one another, the first joining zone, to which the primer is applied, being preheated, prior to application of the primer, by means of a heating device while the first joining zone and the heating device are moved relative to one another, the primer being applied by means of the metering device when the first joining zone is in the preheated state.

In this case, it has been found to be particularly advantageous for the heating device to be moved past the first joining zone at a speed in the range of from 10 mm/min to 100 mm/min, preferably in the range of from 10 mm/min to 30 mm/min, during preheating.

It may further be advantageous for the heating device to precede the metering device, preferably at a defined and constant spacing. In particular, it is advantageous to carry out the method in such a way that the primer is applied to the first joining zone by means of a metering device while the metering device and the first joining zone are moved relative to one another in a range of from 10 mm/min to 100 mm/min, preferably in the range of from 10 mm/min to 30 mm/min, said joining zone to which the primer is applied being preheated, prior to application of the primer, by means of a heating device while the heating device and the first joining zone are moved relative to one another, the heating device preferably simultaneously preceding the metering device or a nozzle of the metering device for applying the primer at a time lag in the range of from 0.1-10 s.

In this case, it has been found to be particularly advantageous to use a coating unit consisting of the metering device and the heating device. In this case, a coating unit can in particular be understood to be a unit that provides a rigid connection between the heating device and the metering device, such that the heating device precedes the metering device preferably at a defined and constant spacing during the relative movement in order to ensure that the first joining zone is preheated immediately before the primer is applied. Of course, it is also conceivable, in this case, for the spacing to be adjustable or, in the case of convective preheating, for the volume flow and/or nozzle diameter of the medium to be adjusted in particular by means of suitable mechanically, electromechanically or pneumatically operated adjusters.

In contrast, the coating unit can also be understood to be a heating device and a metering device in the form of two entirely isolated or separate modules which, however, perform the same or substantially the same relative movement with respect to the plastics material in order to ensure that the location of application of the primer is preheated immediately before the primer is applied.

In an advantageous development, although the heating device and the metering device perform substantially the same primary relative movement or have substantially the same basic direction with respect to the plastics material, at least one of the two mentioned devices experiences an additional relative movement, in addition to said primary relative movement, with respect to the plastics material. Thus, for example, the heating device and/or the metering device can perform one or more secondary relative movements in addition to the primary relative movement during which, for example, the primer may also be applied. For example, in particular the heating device and/or the metering device can perform or experience a secondary relative movement that circles or meanders around the primary relative movement.

In this case, the plastics material on the one hand, or the heating device and the metering device or both devices together as the coating unit on the other hand, can be moved. In this case, it is possible for the heating device and the metering device or both devices together as the coating unit on the one hand, and the plastics material on the other hand, to be stationary or for the moving part thereof to be moved in a different direction in each case.

In an advantageous development, a primary relative movement takes place at a speed in a range of from 10 mm/min to 100 m/min, preferably in a range of from 10 mm/min to 30 m/min, such that for example, in particular also due to a suitable design of the heating device, the residence times of the plastics material within the heating surfaces of the heating device are as short as possible, in particular in a range of from 1 to 60 s. This can be understood to be a region or space around the heating device that influences the temperature in the sense of increasing the temperature, i.e. preheating, of the first joining zone of the first plastics material. It is thus possible to avoid too much heating and damage to the plastics material or degradation of the plastics material for example.

It may in addition prove to be advantageous, in particular in order to connect the metering device and/or the heating device to/into existing production lines, to equip the heating device with a bus interface, in particular for a PROFIBUS, or with a real-time ethernet interface.

After said primer has been applied, the second joining zone is brought into contact with the primer layer. In this case, it may prove to be expedient to fix the two plastics materials together, in particular by means of clamping devices or similar fixing auxiliary agents that are known to a person skilled in the art.

Of course, the second joining zone may optionally be pretreated prior to the step of bringing the second joining zone into contact with the primer layer. In this case, in particular all the above-described pretreatment techniques are conceivable. It is also conceivable for the second plastics material or the joining zones of the second plastics material to be pretreated a longer time before being brought into contact. It is thus conceivable, for example, to already carry out the pretreatment during the process of manufacturing the second plastics material, in order to be able to further process a pretreated plastics material in the method according to the invention. The pretreatment of the second plastics material may also include applying the primer to the second joining zone. In this case, it is preferably also conceivable to preheat the second joining zone prior to applying the primer. The above embodiments are also preferred here.

Bringing the second joining zone and the primer into contact, as described above, is followed by a joining process in which the treated and/or coated join partners are plasticized by means of a supply of heat and are integrally interconnected, preferably under the action of pressure. It is conceivable to use a heat supply by means of thermal conduction, for example by means of hot plate welding and/or thermal contact welding and/or thermal pulse welding; by means of friction, in particular ultrasonic, friction or high-frequency welding; microwave or induction welding; by means of convention, such as warm gas or hot gas welding; by means of radiation, for example infrared, laser butt or laser irradiation welding, or by means of a combination of two or more of said techniques, for this integral connection between the second joining zone and the primer.

This invention further relates to objects or products produced according to the method according to the invention.

Furthermore, this invention relates to the use of a primer according to the invention for welding two polyamide plastics.

EMBODIMENTS

PA=polyamide
PA 6=Polycaprolactam
PA12=Polylauryl lactam
MAH=maleic anhydride
MIBK=methyl isobutyl ketone
CH=cyclohexanone
PS=polystyrene having Mw=192000 g/mol
Copolymer SM1=styrene-maleic anhydride copolymer having 15 wt. % MAH and Mw=170000 g/mol
Copolymer SM2=styrene-maleic anhydride copolymer having 8 wt. % MAH and Mw=250000 g/mol
Copolymer SM3=poly(styrene-co-maleic acid) partially isobutyl/methyl esterified having Mw=180000 g/mol
US=Ultrasonic welding Preparation of primer 1-4:
In order to prepare the primers, the polymer components were dissolved in solvent at 90° C., by mechanical stirring, and left to cool to 20° C. The composition of the primers in g can be found in the following table.

|      | Primer |    |    |      |
| ---- | ------ | -- | -- | ---- |
|      | 1      | 2  | 3  | 4    |
| PS   | 30     |    |    |      |
| SM1  |        | 30 |    |      |
| SM2  |        |    | 30 |      |
| SM3  |        |    |    | 32.5 |
| MIBK | 50     | 50 | 50 |      |
| CH   | 20     | 20 | 20 | 67.5 |

General test execution:
An AWS (American Welding Society) test specimen without an energy director. The lower half of the test specimen consists of a base plate of 50 mm×12.4 mm×2.8 mm having a centrally arranged, perpendicular web 9.4 mm high and 2.5 mm wide (T-shape). The upper half of the test specimen consists of a base plate of 50 mm×12.4 mm×2.8 mm having a centrally arranged, perpendicular web 3 mm high and 2.5 mm wide (T-shape). A double T-shape is achieved by welding the surfaces of the central webs.

The primers were applied, at room temperature, to the surface (50 mm×2.5 mm) of the lower half of the test specimen of an AWS (American Welding Society) test specimen, without an energy director, of the PA12 plastics material to be welded. Subsequently, the primer was dried of solvent for 24 hours at room temperature. After drying, the thickness of the primer was approximately 0.2 mm. Subsequently, the upper half of the test specimen, having a geometry of 50 mm×2.5 mm, was welded edge-to-edge to the 50 mm×2.5 mm surface of the lower half of the test specimen. The tensile strength was determined after 24 hours and at a traction speed of 5 mm/s. The following table in each case shows the tensile strength (in MPa) that was able to be achieved, at room temperature, for the welded test specimens, for the combination of the primer with the plastics materials used:

Ultrasonic welding:

| Primer    | Polymer 1          | Polymer 2         | Tensile strength MPa (US) |
| --------- | ------------------ | ----------------- | ------------------------- |
| No primer | PA12 Grilamid TRS 90 | PA6 Grilamid TR30LS | 4.06                      |
| 1         | PA12 Grilamid TRS 90 | PA6 Grilamid TR30LS | 3.91                      |
| 2         | PA12 Grilamid TRS 90 | PAG Grilamid TR30LS | 6.43                      |
| 3         | PA12 Grilamid TRS 90 | PA6 Grilamid TR30LS | 7.73                      |
| 4         | PA12 Grilamid TRS 90 | PA6 Grilamid TR30LS | 15.26                     |

The results show that the samples welded using a primer containing MAH exhibit excellent tensile strength. The tests with no primer or with a polystyrene as the primer do not have sufficient strength. It can also be seen that the primer layer comprising cyclohexanone as the solvent does not have any bubbles after the solvent has evaporated. However, the time required for the solvent to evaporate increases as the cyclohexanone content in the formulation increases.

What is claimed is:

1. A method for welding two polyamide plastics using a primer, comprising:
   providing a first polyamide substrate including a surface and a second polyamide substrate including a surface;
   providing a primer containing at least one polymer synthesized from at least one maleic anhydride or maleic anhydride derivative;
   applying the primer to at least one of the substrate surfaces;
   disposing the substrate surfaces in contact with each other; and
   welding the substrate surfaces to join the first polyamide substrate to the second polyamide substrate.

2. The welding method according to claim 1, characterized in that the each polyamide substrate is independently selected from the group consisting of polyamide 6, polyamide 6.6, polyamide 6.10, polyamide 6.12, polyamide 10.10, polyamide 11, polyamide 12, polyamide 10.12, polyphthalamides, and optically transparent polyamides.

3. The welding method according to claim 1, characterized in that the at least one polymer is a copolymer consisting of at least one styrene or styrene derivative and at least one maleic anhydride or maleic anhydride derivative.

4. The welding method according to claim 3, characterized in that the copolymer has a molar ratio of styrene to maleic anhydride of from 1:0.01 to 1:2.

5. The welding method according to claim 1, characterized in that the at least one polymer has a maleic anhydride content of 0.1-50 wt. % based on the polymer.

6. The welding method according to claim 1, characterized in that the at least one polymer of the primer has a glass transition temperature Tg of more than 30° C.

7. The welding method according to claim 1, characterized in that the at least one polymer has a weight-average molecular weight Mw in the range of from 5000-2000000 g/mol.

8. The welding method according to claim 1, characterized in that the primer contains, in addition to the at least one polymer, at least one further polymer that is compatible with at least one of the polyamide substrates.

9. The welding method according to claim 1, characterized in that the primer has a solvent content of 10-90 wt. % based on the total weight of the primer.

10. The welding method according to claim 9, characterized in that the solvent has a vapor pressure at 20° C. of from 1 to 600 hPa.

11. The welding method according to claim 1, wherein the first polyamide substrate is selected from the group consisting of polyamide 6, polyamide 6.6, polyamide 6.10, polyamide 6.12 and the second polyamide substrate is selected from the polyamide plastics from the group consisting of polyamide 10.10, polyamide 11, polyamide 12.

12. The welding method according to claim 1, wherein the primer comprises an organic solvent.

13. The welding method according to claim 1, wherein the primer comprises 60-80 wt. % of solvent based on the total weight of the primer and the solvent is selected from tetrahydrofuran, methyl isobutyl ketone (MIBK), cyclohexanone and mixtures thereof.

14. The welding method according to claim 1, wherein the primer is a liquid.

15. The welding method according to claim 1, wherein after the step of applying the primer forms a layer on the substrate surface.

16. An object produced according to a welding method according to claim 1.

* * * * *